United States Patent
Xiao et al.

(10) Patent No.: US 9,830,315 B1
(45) Date of Patent: Nov. 28, 2017

(54) SEQUENCE-BASED STRUCTURED PREDICTION FOR SEMANTIC PARSING

(71) Applicants: Xerox Corporation, Norwalk, CT (US); Centre National de la Recherche Scientifique, Paris (FR)

(72) Inventors: Chunyang Xiao, Grenoble (FR); Marc Dymetman, Grenoble (FR); Claire Gardent, Paris (FR)

(73) Assignees: XEROX CORPORATION, Norwalk, CT (US); Centre National de la Recherche Scientifique, Paris (FR)

(*) Notice: Subject to any disclaimer, the term of this patent is extended or adjusted under 35 U.S.C. 154(b) by 0 days.

(21) Appl. No.: 15/209,135

(22) Filed: Jul. 13, 2016

(51) Int. Cl.
G06F 17/27 (2006.01)
G06N 3/08 (2006.01)

(52) U.S. Cl.
CPC ........ *G06F 17/2785* (2013.01); *G06F 17/276* (2013.01); *G06F 17/2775* (2013.01); *G06N 3/08* (2013.01)

(58) Field of Classification Search
CPC ......... G06F 17/2785; G06N 3/02; G06N 3/08
USPC .......................................................... 704/9
See application file for complete search history.

(56) References Cited

U.S. PATENT DOCUMENTS

| | | | |
|---|---|---|---|
| 6,189,002 B1* | 2/2001 | Roitblat | G06F 17/3061 |
| 8,793,261 B2* | 7/2014 | Jiang | G06F 17/30616 704/9 |
| 2005/0267871 A1* | 12/2005 | Marchisio | G06F 17/30672 |
| 2011/0301942 A1* | 12/2011 | Collobert | G06F 17/2775 704/9 |
| 2015/0356075 A1* | 12/2015 | Rao | G06N 3/0445 705/2 |
| 2016/0180215 A1* | 6/2016 | Vinyals | G06F 17/2705 706/20 |

OTHER PUBLICATIONS

Graves, Alex. "Generating sequences with recurrent neural networks." arXiv preprint arXiv:1308.0850 (2013).*
U.S. Appl. No. 14/702,850, filed May 4, 2015, Dymetman, et al.
U.S. Appl. No. 14/811,005, filed Jul. 28, 2015, Dymetman, et al.
U.S. Appl. No. 14/810,817, filed Jul. 28, 2015, Venkatapathy, et al.
U.S. Appl. No. 15/005,133, filed Jan. 25, 2016, Perez, et al.
U.S. Appl. No. 15/147,222, May 5, 2016, Xiao, et al.

(Continued)

*Primary Examiner* — Shaun Roberts
(74) *Attorney, Agent, or Firm* — Fay Sharpe LLP

(57) ABSTRACT

A system and method are provided which employ a neural network model which has been trained to predict a sequentialized form for an input text sequence. The sequentialized form includes a sequence of symbols. The neural network model includes an encoder which generates a representation of the input text sequence based on a representation of n-grams in the text sequence and a decoder which sequentially predicts a next symbol of the sequentialized form based on the representation and a predicted prefix of the sequentialized form. Given an input text sequence, a sequentialized form is predicted with the trained neural network model. The sequentialized form is converted to a structured form and information based on the structured form is output.

21 Claims, 7 Drawing Sheets

(56) References Cited

OTHER PUBLICATIONS

Bahdanau, et al., "Neural machine translation by jointly learning to align and translate," ICLR 2015, available as CoRR, abs/1409.0473, pp. 1-15 (2014).
Bastien, et al., "Theano: new features and speed improvements," arXiv:1211.5590 pp. 1-10 (2012).
Berant, et al., "Semantic parsing via paraphrasing," Association for Computational Linguistics (ACL) (1), pp. 1415-1425 (2014).
Berant, et al., "Semantic parsing on freebase from question-answer pairs," Empirical Methods in Natural Language Processing (EMNLP), pp. 1533-1544 (2013).
Bergstra, et al., "Theano: a CPU and GPU math expression compiler," Proc. Python for Scientific Computing Conf. (SciPy), vol. 4, p. 1-7 (2010).
Bollacker, et al., "Freebase: a collaboratively created graph database for structuring human knowledge," SIGMOD Conf., pp. 1247-1250 (2008).
Bordes, et al., "Question answering with subgraph embeddings," Proc. 2014 Conf. on Empirical Methods in Natural Language Processing, EMNLP 2014, pp. 615-620 (Oct. 25-29, 2014).
Bordes, et al., "Open question answering with weakly supervised embedding models," Machine Learning and Knowledge Discovery in Databases, vol. 8724 of the series Lecture Notes in Computer Science, pp. 165-180 (2014). available at arXiv:1404.4326.
Cho, et al., "Learning phrase representations using RNN encoder-decoder for statistical machine translation," Proc. 2014 Conf. on Empirical Methods in Natural Language Processing (EMNLP), pp. 1724-1734 (2014).
Chollet, "Keras," GitHub repository, pp. 1-4 (2015), available at https://github.com/fchollet/keras.
Devlin, "Fast and robust neural network joint models for statistical machine translation," Proc. 52nd Annual Meeting of the ACL (ACL 2014), (1): Long Papers, pp. 1370-1380 (2014).
Dong, et al., "Language to Logical Form with Neural Attention," ArXiv 1601.01280, pp. 1-10 (2016).
Fader, et al., "Paraphrase-driven learning for open question answering," Proc. 51st Annual Meeting of the Association for Computational Linguistics (vol. 1: Long Papers), pp. 1608-1618 (2013).
Ganitkevitch, et al., "Ppdb: The paraphrase database," Proc. 2013 Conf. of the North American Chapter of the Association for Computational Linguistics: Human Language Technologies, pp. 758-764 (2013).
Hinton, et al., "Neural Networks for Machine Learning," Lecture Slides, Toronto EDU, pp. 1-31 downloaded on May 5, 2016 from http://www.cs.toronto.edu/~tijmen/csc321/slides/lecture_slides_led6.pdf.
Hochreiter, et al., "Long short-term memory," Neural Computation, 9(8):1735-1780 (1997).
"Keras: Deep Learning library for Theano and TensorFlow," pp. 1-4, available at http://keras.io/) downloaded on Jul. 13, 2016.
Kwiatkowski, et al., "Scaling semantic parsers with on-the-fly ontology matching.," Proc. 2013 Conf. on Empirical Methods in Natural Language Processing, EMNLP 2013, pp. 1545-1556 (2013).

Pascanu, et al., "How to construct deep recurrent neural networks," arXiv:1312.6026, pp. 1-13 (2013).
Pasupat, et al., "Compositional semantic parsing on semi-structured tables," ACL (1) 1470-1480, available at ArXiv 1508.00305 (2015).
Pereira, et al., "Definite clause grammars for language analysis: a survey of the formalism and a comparison with augmented transition networks," Artificial Intelligence, vol. 13(3), pp. 231-278 (1980).
Ploj, et al., "Border Pairs Method—Constructive MLP Learning Classification Algorithm," Advances in Machine Learning Research, Chapter 3, vol. 6943 of the series Lecture Notes in Computer Science, pp. 297-307 (2014).
Sathyanarayana, "A Gentle Introduction to Backpropagation," pp. 1-15, available at http://numericinsight.com/uploads/A_Gentle_Introduction_to_Backpropagation.pdf., downloaded on Jul. 13, 2016.
Siva Reddy, et al., "Large-scale semantic parsing without question-answer pairs," Trans. ACL, 2, pp. 377-392 (2014).
Srivastava, et al., "Dropout: A simple way to prevent neural networks from overfitting," J. Mach. Learn. Res., vol. 15(1), pp. 1929-1958 (2014).
Sutskever, et al., "Sequence to sequence learning with neural networks," Advances in Neural Information Processing Systems (NIPS 2014), pp. 3104-3112 (2014).
Swipl, pp. 1 (http://www.swi-prolog.org/), downloaded on Jul. 13, 2016.
Theano 0.7 documentation, pp. 1-4, available at http://deeplearning.net/software/theano/ downloaded on Jul. 13, 2016.
Tieleman, et al., "rmsprop," rmsprop-climin 0.1 documentation, pp. 1-2, (2012), downloaded on Mar. 2, 2016 from http://climin.readthedocs.org/en/latest/rmsprop.hrml#id1.
Vinyals, et al., "Grammar as a foreign language," Advances in Neural Information Processing Systems (NIPS 2015), pp. 2755-2763 (2015), available at arXiv:1412.7449.
Wang, et al., "Building a semantic parser overnight," Proc. 53rd Annual Meeting of the Association for Computational Linguistics and the 7th International Joint Conf. on Natural Language Processing of the Asian Federation of Natural Language Processing (ACL 2015), vol. 1: Long Papers, pp. 1332-1342 (2015).
Wen, et al., "Semantically conditioned LSTM-based natural language generation for spoken dialogue systems," EMNLP 2015, pp. 1711-1721 (2015), available at arXiv:1508.01745.
Xu, et al., "Show, attend and tell: Neural image caption generation with visual attention," Proc. 32nd International Conf. on Machine Learning (JMLR: W&CP), vol. 37, pp. 1-10 (2015).
Yih, et al., "Semantic parsing for single-relation question answering," Proc. 52nd Annual Meeting of the Association for Computational Linguistics (ACL 2014), vol. 2: Short Papers, pp. 643-648 (2014).
Zettlemoyer, et al., "Learning to map sentences to logical form: Structured classification with probabilistic categorial grammars," Proc. 21st Conf. in Uncertainty in Artificial Intelligence (UAI '05), pp. 658-666(2005).
"Multilayer Perceptron," DeepLearning 0.1 documentation, pp. 1-12, downloaded on Mar. 2, 2016 from http://deeplearning.net/tutorial/mlp.html.

\* cited by examiner

SEQUENCE-BASED STRUCTURED PREDICTION FOR SEMANTIC PARSING

BACKGROUND

The exemplary embodiment relates to natural language processing and finds particular application in connection with a system and method for prediction of structured forms based on natural language utterances.

Mapping natural language utterances (NLU) to logical forms (LF), a process known as semantic parsing, has various applications, such as in the building of Question-Answering systems (Tom Kwiatkowski, et al., "Scaling Semantic Parsers with On-the-Fly Ontology Matching," *Proc. Conf. on Empirical Methods in Natural Language Processing (EMNLP)*, pp. 1545-1556, 2013; J. Berant et al., "Semantic Parsing on Freebase from Question-Answer Pairs," *EMNLP*, pp. 1533-1544, 2013; J. Berant, et al., "Semantic Parsing via Paraphrasing," *Association for Computational Linguistics (ACL)*, pp. 1415-1425, 2014). In question answering, the goal is to be able to process a question formulated in natural language, map it into a logical form, and then retrieve an answer to that question from a knowledge base.

Difficulties arise when the natural language utterance is a semantically complex question, leading to a logical form query with a fair amount of compositionality (Panupong Pasupat, et al., "Compositional Semantic Parsing on Semi-Structured Tables," *ACL* (1) 1470-1480, 2015).

Methods for building semantic parsers are described, for example, in Wang, et al., "Building a semantic parser overnight," Proc. 53rd Annual Meeting of the ACL and 7th Intl Joint Conf. on Natural Language Processing of the Asian Federation of Natural Language Processing (ACL 2015), Vol. 1: Long Papers, pp. 1332-1342, 2015, hereinafter, Wang 2015). A small generic grammar is used to generate so-called canonical (textual) forms and pair them with logical forms. Crowdsourcing is then used to paraphrase these canonical forms into natural utterances. The crowdsourcing thus creates a dataset (referred to herein as the SPO dataset) consisting of (NL, CF, LF) tuples where NL is a natural language utterance, CF is its canonical form and LF is the logical form associated with CF by the grammar. A semantic parser is then learnt over this dataset.

Wang 2015 learns a semantic parser on this dataset by firstly learning a log-linear similarity model based on a number of features (word matches, ppdb matches, matches between semantic types and POS, etc.) between the NL and the correct (CF, LF). At decoding time, a natural utterance NL is parsed by searching among the derivations of the grammar for one for which the projected (CF, LF) is most similar to the NL based on the log-linear model. The search is based on a so-called "floating parser," as described in Panupong Pasupat, et al., "Compositional Semantic Parsing on Semi-Structured Tables," *arXiv:*1508.00305, 2015, which is a modification of a standard chart-parser, which is able to guide the search based on the similarity features.

Although the parser used in Wang does not have good accuracy in many domains, the crowdsourcing approach has proved useful in generating training data, as described in copending application. Ser. No. 14/811,005, discussed below.

Recurrent Neural Networks (RNNs) have proved effective in some natural language processing (NLP) applications. For example, Long Short-Term Memory networks (LSTMs) have been used for performing sequence prediction in NLP applications, such as translation and natural language generation (Sepp Hochreiter, et al., "Long Short-Term Memory," *Neural Computation,* 9(8):1735-1780, 1997; Ilya Sutskever, et al., "Sequence to Sequence Learning with Neural Networks," *Advances in Neural Information Processing Systems (NIPS)*, pp. 3104-3112, 2014; Tsung-Hsien Wen, et al., "Semantically Conditioned LSTM-based Natural Language Generation for Spoken Dialogue Systems," *EMNLP*, pp. 1711-1721, 2015). These approaches, however, try to predict intrinsically sequential objects (texts), whereas a logical form is a structured object that is tree-like by nature and also has to respect certain a priori constraints in order to be interpretable against a knowledge base.

INCORPORATION BY REFERENCE

The following references, the disclosures of which are incorporated herein by reference in their entireties, are mentioned:

U.S. application Ser. No. 14/811,005, filed Jul. 28, 2015, entitled A ROBUST REVERSIBLE FINITE-STATE APPROACH TO CONTEXTUAL GENERATION AND SEMANTIC PARSING, by Marc Dymetman, et al.

U.S. application Ser. No. 14/810,817 filed Jul. 28, 2015, entitled LEARNING GENERATION TEMPLATES FROM DIALOG TRANSCRIPTS, by Sriram Venkatapathy, et al.

U.S. application Ser. No. 15/147,222, filed May 5, 2016, entitled SEMANTIC PARSING USING DEEP NEURAL NETWORKS FOR PREDICTING CANONICAL FORMS, by Chunyang Xiao, et al.

BRIEF DESCRIPTION

In accordance with one aspect of the exemplary embodiment, a method includes providing a neural network model which has been trained to predict a sequentialized form for an input text sequence. The sequentialized form includes a sequence of symbols. The neural network model includes an encoder which generates a representation of the input text sequence based on a representation of n-grams in the text sequence, and a decoder which sequentially predicts a next symbol of the sequentialized form based on the representation and a predicted prefix of the sequentialized form. An input text sequence is received. A sequentialized form is predicted for the input text sequence with the trained neural network model. The sequentialized form is converted to a structured form and information output, based on the structured form.

One or more of the steps of the method may be performed with a processor.

In accordance with one aspect of the exemplary embodiment, a system includes memory which stores a neural network model which has been trained to predict a sequentialized form for an input text sequence. The sequentialized form includes a sequence of symbols. The neural network model includes an encoder which generates a representation of the input text sequence based on a representation of n-grams in the text sequence, and a decoder which sequentially predicts symbols of the sequentialized form based on the representation and a predicted prefix of the sequentialized form. A prediction component predicts a sequentialized form for an input text sequence with the trained neural network model. A structured form generation component converts the sequentialized form to a structured form. An output component outputs information based on the structured form. A processor implements the prediction component, structured form generation component, and output component.

In accordance with one aspect of the exemplary embodiment, a method for predicting a logical form includes providing training data, the training data comprising a collection of training pairs, each training pair in the collection including a derivation sequence and a corresponding text sequence. The derivation sequence includes a sequence of symbols drawn from a finite set of symbols. With the training data, a neural network model is trained to predict a derivation sequence for an input text sequence. The neural network model includes an encoder which generates a representation of the input text sequence based on a representation of n-grams in the text sequence and a decoder which sequentially predicts symbols of the derivation sequence based on the representation and a predicted prefix of the derivation sequence. An input text sequence is received. A derivation sequence form for the input text sequence is predicted with the trained neural network model. The derivation sequence includes a sequence of symbols drawn from the finite set of symbols. Information is output based on the predicted sequentialized form.

DETAILED DESCRIPTION

Aspects of the exemplary embodiment relate to a system and method for semantic parsing in which a recurrent neural network is used to map a natural language question to a logical form, which can be used to query a knowledge base.

Figure 1:
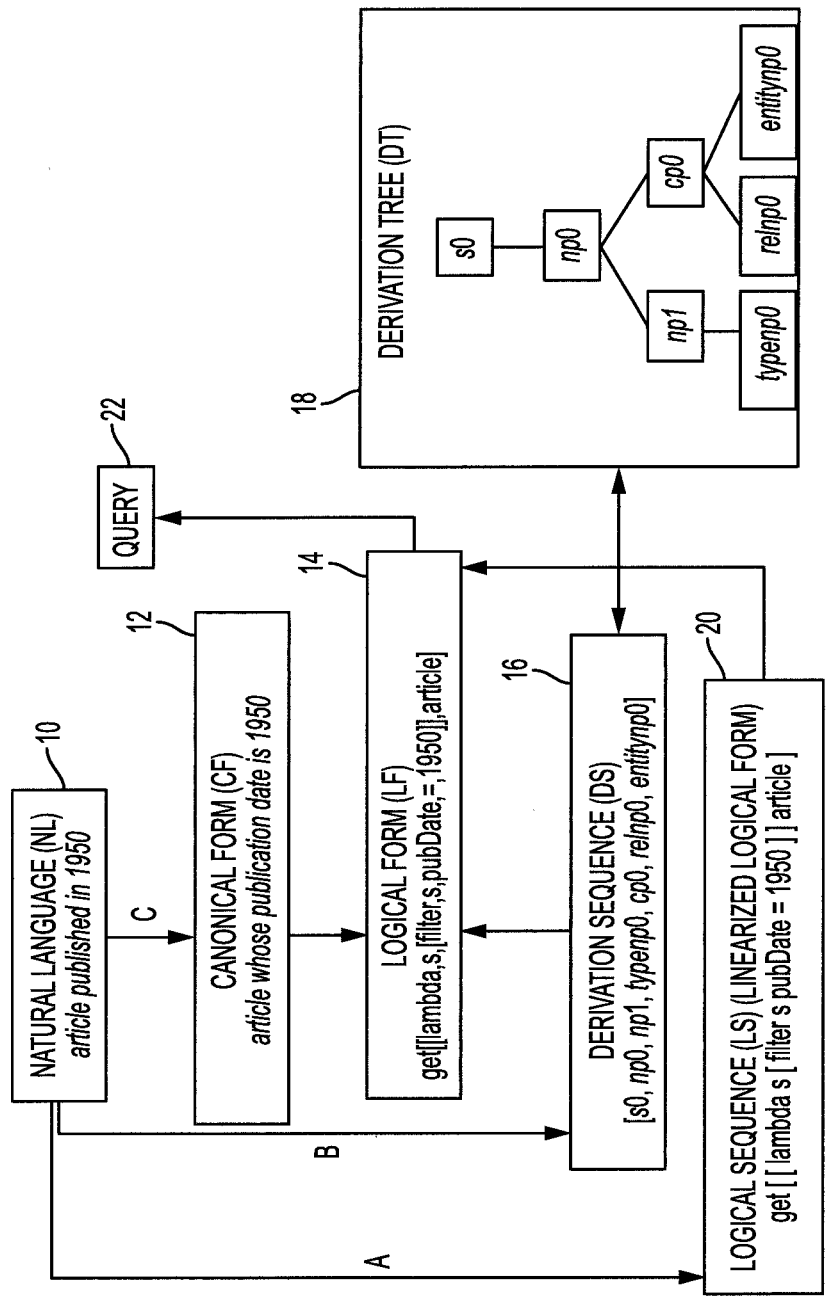
FIG. 1 illustrates relationships between different sequentialized forms and structured forms used in the exemplary system and method.

With reference to FIG. 1, some of the terminology referred to herein is illustrated.

A "natural language question" (NL) 10 is a text sequence in a natural language, such as English or French, in an interrogatory form, constructed using the vocabulary and grammar of the language, which is understandable by speakers of the language.

A "sequentialized form" is a sequence of symbols which can be mapped to a logical form. The symbols are drawn from a set of symbols, which may be a predefined finite set.

A "canonical form" (CF) 12 is a type of sequentialized form in a normalized pseudo-natural language that is close to English, which can easily be translated into a logical form exploitable by search tools over knowledge bases. The symbols of the canonical form are words.

A "logical form" (LF) 14 is a structured representation of a canonical form, e.g., in the form of a tree or graph, which is suitable for querying a structured knowledge base.

A derivation sequence (DS) 16 is a type of sequentialized form comprising or consisting of a sequence of grammar rules (e.g., their rule names), which are consistent with a predefined grammar, from which a logical form can be derived. The symbols of the derivation sequence are grammar rules drawn from a finite set of grammar rules.

A Derivation Tree (DT) 18 is a structured representation of a derivation sequence, e.g., in the form of a tree or graph.

A Logical Sequence (LS) 20 is a linearized form of a logical form 14, and is a sequence of individual tokens which generally includes non-word symbols (such as parentheses and instructions) as well as words.

In the exemplary method, logical forms are enumerated by an underlying grammar and are paired with their sequentialized forms (CF, LF or DS). In order to perform sequence prediction, these logical forms are sequentialized. Three sequentialization methods are described by way of example:

A) Logical Form Prediction (LFP): Predicting a direct linearization LS 20 of the logical form 14, the LS being a sequence of individual tokens which is a linearized form of the logical form 14 from which it could be generated.

B) Derivation Sequence Prediction (DSP): Predicting a derivation sequence 16, which is a sequence of underlying grammar rules from which the logical form would be generated.

C) Canonical Form Prediction (CFP): Predicting the associated canonical form 12 of the logical form 14, which is itself sequence of individual words.

Given a natural language question 10, the question is mapped to one of the three sequentializations 20, 12, 16 using a sequential predictor that is based on recurrent neural network (RNN) model, such as a Long Short-Term Memory (LSTM)-based model. The LSTM model may not on its own ensure that the predicted sequence 20, 12, 16 is grammatical. In method B, grammatical constraints on the derivation sequence 16 can be integrated into the recurrent Neural Network (RNN)-based sequential predictor. The logical form 14 is generated from the sequentialization 20, 12, 16 and can be used to generate a knowledge base (KB) query 22. As will be appreciated, logical forms generated from two or more of the sequentializations 20, 12, 16 can be used to generate a query 22 or the results of separate queries may be aggregated, An evaluation of the method shows significant improvements over results of previous methods for the same dataset, and also demonstrates the advantage of incorporating the grammatical constraints in method B.

The system and method are of particular relevance to the automation of call-centers through virtual agents and to question-answering systems.

As in copending application Ser. No. 15/147,222, the method of Wang 2015 may be employed for efficiently developing data resources for learning a semantic parser. The present method, however, learns a semantic parser from these resources differently from Wang.

Figure 2:
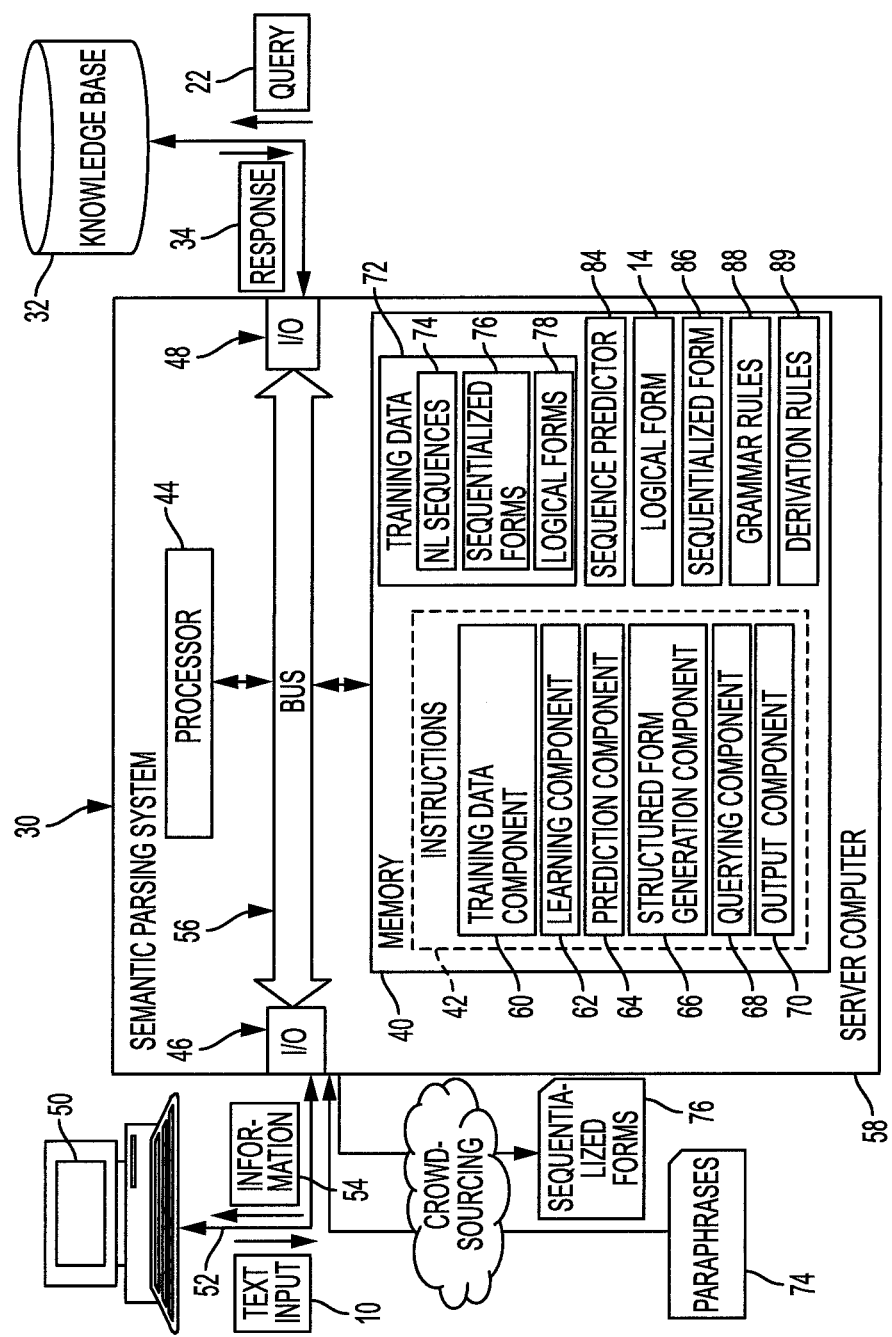
FIG. 2 is a functional block diagram of a semantic parsing system in accordance with one aspect of the exemplary embodiment.

FIG. 2 illustrates a computer-implemented semantic parsing system 30 which receives an input sequence of natural language text 10, such as a question in a natural language, such as English, and predicts a logical form 14 for the input text. The logical form may then be used to generate a query 22 for querying an information source 32, such as a knowledge base, and retrieving responsive information 34 therefrom.

The system 30 includes memory 40, which stores instructions 42 for performing a method described with reference to FIG. 3, and a processor 44, in communication with the memory, for executing the instructions. The system includes one or more input/output devices 46, 48, for communication with external devices, such as a source 50 of the input text 10, via wired or wireless links 52, such as a local area network or a wide area network, such as the Internet. The system outputs information 54, such as the logical form 14, query 22, query response 34, and/or information based thereon. Hardware components 40, 44, 46, 48 of the system communicate via a data/control bus 56. The system may be hosted by one or more computing devices, such as the illustrated server computer 58.

The illustrated instructions 42 include a training data component 60, a learning component 62, a prediction component 64, a structured (e.g., logical) form generation component 66, a querying component 68, and an output component 70, although it is to be appreciated that one or more of these components may be omitted from the system 10 and/or hosted by different computing systems.

Briefly, the training data component 60 provides the learning component 62 with training data 72. The training data 72 includes a set of input sequences 74, which are natural language utterances, similar to the input natural language text 10, and corresponding sequentialized sequences 76 (analogous to sequences 20, 12, or 16), which may each have been generated from a corresponding logical form 78. The training data 72 may have been previously generated and input to the system. In another embodiment, the training data is generated using crowdsourcing to generate text sequences 74 that are paraphrases of canonical forms 76 generated from logical forms 78 by the training data component 60.

The learning component 62 learns a sequence predictor 84, such as a neural network, for predicting a sequence 86, given the input text sequence 12. The sequence 86 is a serialized form (i.e., one of sequences 20, 12, or 16) which includes a sequence of symbols drawn from the same set of symbols as the sequentialized forms 76 used in training. The exemplary sequence predictor 84 is a seq2seq (i.e., sequence to sequence) recurrent neural network model that maps natural utterances to a sequentialized form 86. The sequence predictor 84 is learned using the training data 72 which includes training pairs, each training pair including a natural language text sequence 74 and a corresponding sequentialized form 76.

The prediction component 64 uses the learned sequence predictor 84 to predict an output sequentialized form 86 for an input text sequence 10.

The logical form generation component 66 converts the output sequence 86 to a structured logical form 14. For converting a derivation sequence 16 to a logical form 14, a set of grammar rules 88 and associated derivation rules 89 may be stored in memory 40.

The querying component 68 uses the logical form 14 to generate a query 22, such as an SQL query, for querying the knowledge base 32. One or more responses 34 retrieved from the knowledge base for the query, or other information 54 based thereon, may be output by the output component 70, e.g., to the source 50 of the query.

As will be appreciated, rather than generating a query, the logical form 14 may be used for other purposes, such as generating a next utterance by an agent (virtual or real) in a discourse with a person, such as a customer seeking assistance from a call center.

The computer system 30 may include one or more computing devices 58, such as a PC, such as a desktop, a laptop, palmtop computer, portable digital assistant (PDA), server computer, cellular telephone, tablet computer, pager, combination thereof, or other computing device capable of executing instructions for performing the exemplary method.

The memory 40 may represent any type of non-transitory computer readable medium such as random access memory (RAM), read only memory (ROM), magnetic disk or tape, optical disk, flash memory, or holographic memory. In one embodiment, the memory 40 comprises a combination of random access memory and read only memory. In some embodiments, the processor 44 and memory 40 may be combined in a single chip. Memory 40 stores the processed data 72, 86, 14 as well as the instructions for performing the exemplary method.

The network interface 46, 48 allows the computer to communicate with other devices via a computer network, such as a local area network (LAN) or wide area network (WAN), or the internet, and may comprise a modulator/demodulator (MODEM) a router, a cable, and/or Ethernet port.

The digital processor device 44 can be variously embodied, such as by a single-core processor, a dual-core processor (or more generally by a multiple-core processor), a digital processor and cooperating math coprocessor, a digital controller, or the like. The digital processor 44, in addition to executing software instructions 42 may also control the operation of the computer 58.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 3:
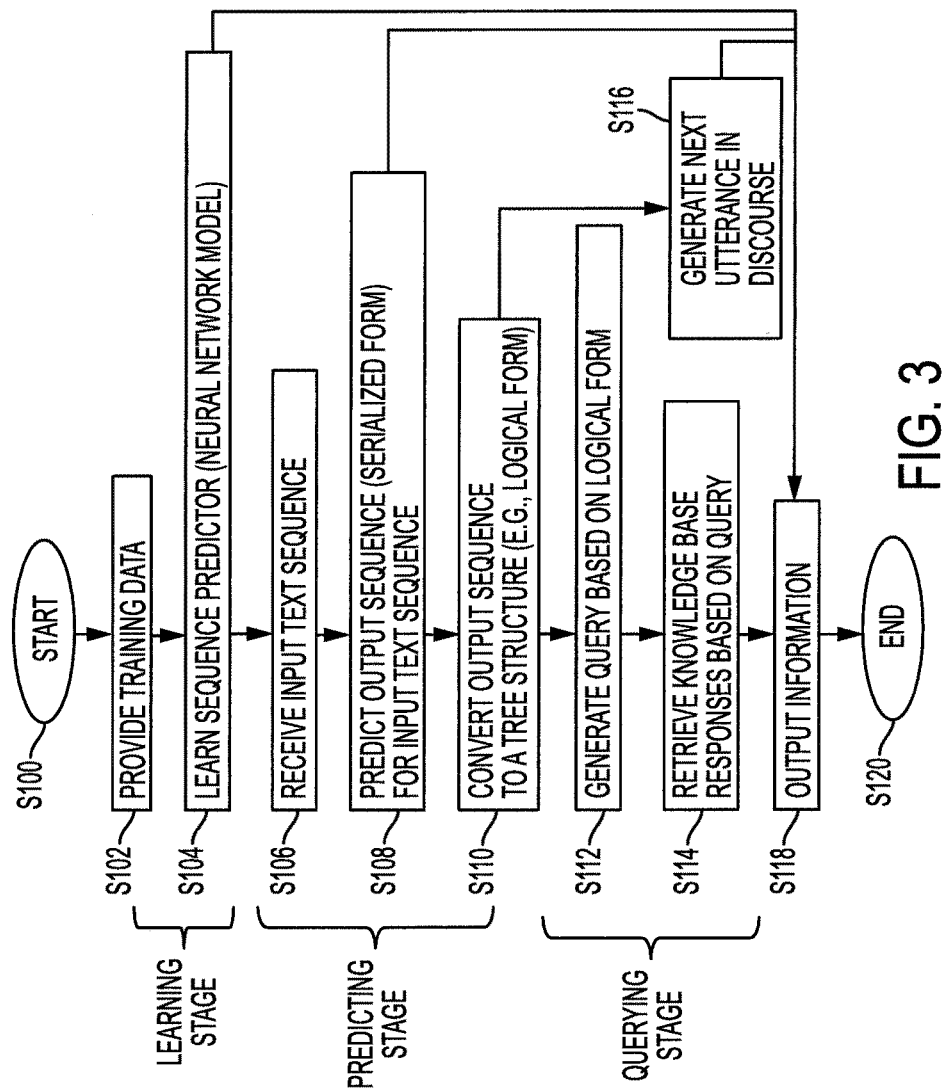
FIG. 3 is a flowchart illustrating a method for generating logical forms in accordance with another aspect of the exemplary embodiment.

FIG. 3 illustrates an exemplary method which may be performed with the system of FIG. 2. The illustrated method includes a learning stage, a predicting stage, and a querying stage, although fewer than all of these stages may be performed. The method begins at S100.

At S102, training data 72 for learning the sequence predictor 84 is provided, e.g., input to the system or generated by the training data component 60, as further described with reference to FIG. 4.

At S104, the sequence predictor 84 is learned by the learning component 62, using the training data 72.

At S106, an input text sequence 10 is received, and may be stored in memory 40 during processing.

At S108, an output sequence 86 corresponding to the input text sequence 10 is predicted with the trained sequence predictor 84, by the prediction component 64.

At S110, the output sequence 86 is converted to a logical form 14 by the logical form generation component 66, e.g., with the grammar rules 88 and derivation rules 89.

At S112, the logical form 14 may be used, by the querying component 68, to generate a query 22 for querying the knowledge base 32 and at S114, one or more responses 34 is/are received.

In another embodiment, the logical form may be used at S116 to identify a next utterance of a discourse, e.g., between an agent and a customer.

At S118, information 54 based on the logical form 14, response(s) 34, and/or next utterance is output from the system 30, by the output component 70.

The method ends at S120.

In other embodiments, the method may include only the learning stage, in which case, the output of the system may be the sequence predictor 84. In other embodiments, the method may be used for one or more of steps S106-S116, i.e., assuming the existence of the already trained sequence predictor 84.

Further details of the system and method will now be described.

Grammars and Derivations

The core grammatical resource released by SPO (Wang 2015, https://github.com/percyliang/sempre) is a generic grammar connecting logical forms LF with canonical form realizations CF. SPO also provides seven domain specific lexica that can be used in combination with the generic grammar to obtain domain-specific grammars which generate pairs (LF, CF) in each domain, in such a way that LF can then be used to query the corresponding knowledge base. SPO also released a set of Java-based parsers and generators for these grammars.

The exemplary derivation sequence 16 is a sequence of grammar rules drawn from the set of grammar rules 88. The sequence of rules is converted to a derivation tree 18 where each node represents one of the rules from the derivation sequence. The set of derivation rules 89 is used for projecting the derivation tree 16 onto a canonical or logical form 12, 14. For convenience, the SPO grammars can be translated into the formalism of Definite Clause Grammars (DCG) (F. C. N. Pereira, et al., "Definite Clause Grammars for Language Analysis: A Survey of the Formalism and a Comparison with Augmented Transition Networks," B. J. Grosz, et al., eds., *Natural Language Processing*, pp. 101-124, Kaufmann, Los Altos, Calif., 1986), a classical unification-based extension of context-free grammars, which, through a standard Prolog interpreter such as Swipl (http://www.swi-prolog.org/), provide direct support for jointly generating textual realizations and logical forms and also for parsing text into logical forms. A straightforward translation process can thus be achieved.

TABLE 1 lists a few DCG rules 88, general rules first, then lexical rules for the SPO "publications" domain. Nonterminals are indicated in bold, terminals (leaf nodes) in italics. Each rule is provided with a unique identifier (s0, np0, etc.), which is obtained by concatenating the name of its head nonterminal with a position number relative to the rules that may expand this nonterminal. The nonterminal (e.g. np) is considered the "type" of all its expanding rules (e.g., np0, np1, . . . ).

TABLE 1

Example Grammar rules in DCG format

| Rule | |
|---|---|
| General Rules | |
| s0: | s(S) → np(S) . |
| np0: | np(get[CP,NP]) → np(NP), cp(CP) . |
| np1: | np(NP) → typenp(NP) . |
| cp0: | cp([lambda,s,[filter,s,RELNP,=,ENTNP]]) → [whose], relnp(RELNP), [is], entitynp(ENTNP) . |
| . . . | |
| Domain Specific Lexical Rules | |
| typenp0: | typenp(article) → [article]. |
| relnp0: | relnp(pubDate) → [publication, date] |
| entitynp0: | entitynp(1950) → [1950] |
| . . . | |

According to standard DCG notation, uppercase items S, NP, CP, RELNP, ENTNP denote unification variables that become instantiated during processing, in the present case to logical forms. Each nonterminal has a single argument denoting a partially instantiated associated LF. For example, in rule cp0, relnp is associated with the LF RELNP, entitynp with the LF ENTNP, and the LHS nonterminal cp is then associated with the LF [lambda, s, [filter, s, RELNP, =, ENTNP]]. This LF is written here in DCG list notation; in the format used by SPO, it would be written (lambda s (filter s RELNP=ENTNP)).

FIG. 1 shows the derivation tree 18, relative to this grammar, where each node is labelled with a rule identifier. The tree 18 projects onto the canonical form 12 article whose publication date is 1950, and also onto the logical form 14 get[[lambda,s,[filter,s, pubDate,=,1950]],article]. These projections are obtained by bottom-up composition, with the derivation rules 89, as illustrated in TABLE 2.

TABLE 2

Projection of the derivation tree nodes into (i) a canonical form and (ii) a logical form

| Grammar rule | Canonical form | Logical Form |
|---|---|---|
| typenp0 | article | article |
| relnp0 | publication date | pubDate |
| entitynp0 | 1950 | 1950 |
| cp0 | whose publication date is 1950 | [lambda,s,[filter,s,pubDate,=,1950] |
| np1 | article | article |
| np0 | article whose publication date is 1950 | get[[lambda,s,[filter,s,pubDate,=, 1950]],article] |
| s0 | article whose publication date is 1950 | get[[lambda,s,[filter,s,pubDate,=, 1950]],article] |

For example, the textual projection of node cp0 is obtained from the textual representations of nodes relnp0 and entitynp0, according to the RHS of the rule cp0, while its LF projection is obtained by instantiation of the variables RELNP and ENTNP respectively to the LFs associated with relnp0 and entitynp0.

As will be appreciated, there is a difference between derivation trees DT 18 and their projections CF 12 and LF 14. While the well-formedness of a DT can simply be assessed locally by checking that each node expansion is valid according to the grammar, a process known as parsing, checking that the CF or the LF is well-formed is more difficult. To check the validity of a proposed CF (resp. LF), a search could be made for a DT that projects onto this CF (resp. LF). This process is known as "parsing" for CF and "generation" for LF. While parsing has polynomial complexity for grammars with a context-free backbone such as the ones considered here, deciding whether a logical form is well-formed or not can be undecidable for certain forms of LF composition.

In one embodiment, each derivation tree DT 18 is associated with a derivation sequence DS, which corresponds to a predefined order traversal of the tree. Given a derivation tree 18, the derivation sequence 16 can be generated by applying a sequence generation rule which defines how the next node of the tree is selected. For example in a leftmost rule, in a first step, the leftmost path is traversed from the root node (s0) to the terminal (leaf) node (typenp0) and the nodes along the path are added to the sequence 16. In a second step, the rule then returns to the highest level where there is a node (cp0) that has not been added to the sequence and follows a leftmost path from that node to a leaf (relnp0), adding each of these nodes sequentially to the sequence. This step is repeated until there are no further nodes to add. The illustrated derivation sequence is therefore [s0, np0, np1, typenp0, cp0, relnp0, entitynp0].

When the grammar is known (in fact, as soon as the CFG core of the grammar is known), two properties of the DS hold:

1. knowing the DS 16 uniquely identifies the derivation tree.

2. knowing a prefix of the DS (for example [s0, np0, np1, typenp0]) completely determines the type of the next item (here, this type is cp).

The first property implies that if a DS can be predicted, DT can also be predicted, and therefore also LF and CF. The second property implies that the sequential prediction of DS is strongly constrained by a priori knowledge of the underlying grammar: instead of having to select the next item among all the possible rules in the grammar, selection can be made among only those rules that are headed by a specific nonterminal. Under a simple condition on the grammar (namely that there are no "unproductive" rules, rules that can never produce an output), following such constrained selection for the next rule guarantees that the derivation sequence will always lead to a valid derivation tree.

There is, however, no finite-state mechanism on the sequence of rule-names that can control whether the next rule-name is valid or not. This can be seen by considering a CFG generating the non-finite-state language anbn. The relevance of this observation is that RNNs are basically finite-state devices (with a huge number of states, but still finite-state), and therefore they cannot be expected to be able to always produce valid derivation sequences unless they can exploit the underlying grammar for constraining the next choice. In one embodiment, the sequence prediction therefore exploits constraints based on the underlying grammar to bias the predictions.

Sequence Prediction Models

The sequence predictor 84 takes a natural utterance NL 10 and predicts a sequence 86 of target symbols. Various prediction models 84 are contemplated.

A. Logical Form Prediction (LFP) Model

In this approach, a linearization LS 20 of the logical form 14 is predicted directly from the NL 10. While an LF 14, as illustrated in FIG. 1 is really a structured object (such as a tree or graph), respecting certain implicit constraints (balanced parentheses, consistency of the variables bound by lambda expressions, and more generally, conformity with the underlying grammar), the linearization LS treats it simply as a sequence of tokens: get [[lambda s [filters pubDate=1950] ] article]. At training time, the LFP model 84 is trained with such sequences and corresponding NLs. At test time, the next token in the target sequence LS 20 is then predicted without taking into account any structural constraints. The training regime can be one that attempts to minimize the cross-entropy of the model relative to the logical forms in the training set.

Figure 4:
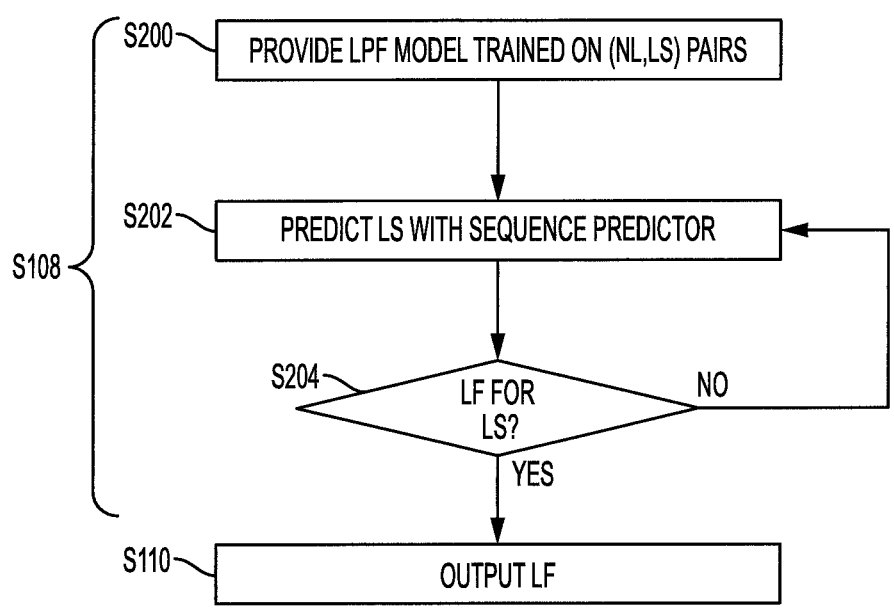
FIG. 4 illustrates prediction of a sequentialized form in accordance with one aspect of the exemplary method.

FIG. 4 illustrates the prediction step S108 in this embodiment.

At S200, a trained LPF model 84 is provided.

At S202, the LPF model is used to predict an LS 20, based on the input NL 10.

If at S204 a well-formed LF cannot be generated from the LS 20 by converting the LS to a tree structure, the method returns to S202, otherwise to S110, where the LF is output. It should be noted, however, that it is not always possible to know whether the LS can be converted into a tree structure in polynomial time.

B. Derivation Sequence Prediction (DSP) Models

Rather than predicting LF directly, DSP models 84 predict a derivation sequence DS 16. The DS is a sequence of rule-names (such as s0 and np0 in the DS of FIG. 1), which is then projected onto an LF. Three variants of this model are illustrated:

i. DSP-S Model

The standard derivation sequence prediction (DSP-S) model is trained on pairs (NL, DS) with a standard training regime (which does not incorporate grammar-based constraints on the next symbol predicted). At prediction time, the model may predict ill-formed sequences, which do not correspond to grammatical derivation trees, and therefore do not project onto any logical form.

Figure 5:
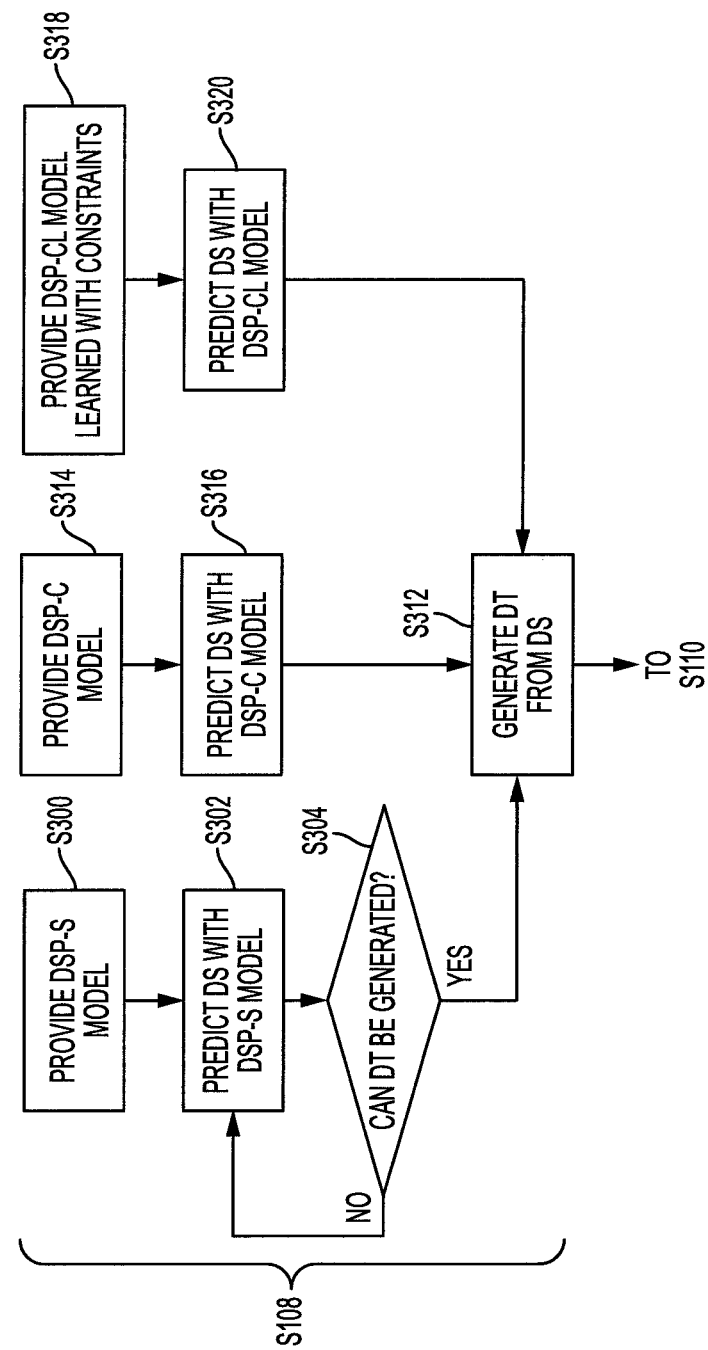
FIG. 5 illustrates prediction of a sequentialized form in accordance with other aspects of the exemplary method.

As illustrated in FIG. 5, DSP-S prediction starts with a trained DSP-S model (S300). At S302, the model takes as input an NL 10 and predicts a derivation sequence 16, symbol by symbol. At each iteration, the DSP-S model samples a symbol, favoring the best weighted symbol as the next symbol in the sequence. If at S304, the model predicts a DS for which a derivation tree cannot be created, the method returns to S302, where a predicted DS with a lower prediction score is retrieved. Otherwise, the method proceeds to S312, where the DT is generated. This approach however may create a large number of possible sequences, which may be computationally inefficient.

ii. DSP-C Model

The constrained derivation sequence prediction (DSP-C) model is a constrained variant of the DSP-S model. In this model. The underlying grammar is used to constrain the next rule-name generated. The DSP-C model is trained in the same manner as the DSP-S model, but at prediction time, when sampling the next rule-name inside the RNN, any rule that is not a possible continuation is rejected. It is easy to determine whether a candidate derivation sequence is well-formed, according to the grammar. In practice, not all sequences are valid against the grammar.

As illustrated in FIG. 5, DSP-C prediction starts with a trained DSP-S model to which constraints are added, giving a DSP-C model (S304). At S316, the model takes as input an NL 10 and predicts a derivation sequence 16, symbol by symbol as for the DSP-S model, but using the constraints to exclude any symbol that does not meet the grammar constraints. For example, if the sequence s0, np0, np1, typenp0, in FIG. 1 has already been generated, there are constraints on the next symbol. For example an np0 cannot appear as the next symbol due to the grammar rule (in Table 1) which specifies that the children of an np0 node are of types np and cp. Since the sequence already generated corresponds to the left subtree of the corresponding derivation tree, which already has an np node as the child of an np0 node, a cp type node is needed. While at this stage, the symbol cp0 may not be the only choice, it is more likely to predicted than where no constraints are imposed.

The constraints are expected to produce a DS which can be converted to a well-formed DT, so the method proceeds from S316 to S312, where a derivation tree is generated.

iii. DSP-CL Model

The constraint loss derivation sequence prediction (DSP-CL) model is trained on pairs (NL, DS) with a training regime which incorporates grammar-based constraints in computing the loss 106. In the standard learning regime (used for the two previous models), the incremental loss when predicting the next item $y_t$ of the sequence is computed as $-\log p(y_t)$, where $p(y_t)$ is the probability of $y_t$ according to the RNN model, normalized (through the computation of a softmax) over all the potential values of $y_t$ (namely, here, all the rules in the grammar). In contrast, in the CL learning regime, the incremental loss is computed as $-\log p'(y_t)$, where $p'(y_t)$ is normalized over only over the values of $y_t$ that are possible continuations once the grammar-induced constraints are taken into account, ignoring whatever weights the RNN predictor may (wrongly) believe should be put on impossible continuations. Specifically, the DSP-CL model incorporates the prior knowledge about well-formed derivation sequences that are based on the grammar. It computes the actual cross-entropy loss according to the underlying generative process of the model that is used once the constraints are taken into account. The constraints are therefore incorporated into the training (and also into prediction, as for the DSP-C method).

As illustrated in FIG. 5, at S318, a DSP-CI model is provided which has been trained on (NL, DS) sequence with a loss function that incorporates a set of grammar constraints. At S320, the model takes as input an NL 10 and predicts a derivation sequence 16, symbol by symbol as for the DSP-S model. The output is expected to be a well-formed DS, which can then be used to generate a DT at S312.

In each of the three variants of S108 shown in FIG. 5, the method may proceed from S108 to S110, where a logical form is generated from the DS.

C. Canonical Form Prediction (CFP) Model

In this embodiment, the sequence prediction model 84 is a CFP model that predicts the sequence of words in the canonical form CF 12. At S110, the grammar is used to parse the CF into its corresponding LF 14. Although the grammar developed by SPO aims to unambiguously reflect the logical form through the canonical form, there may be some cases where, although the CF is well-formed and therefore parsable by the grammar, several parses are possible, some of which do not correspond to queries for which the KB can return an answer. In these cases, the first parse whose logical form does return an answer can be used.

The Sequence Predictor

An example sequence predictor 84 is a recurrent neural network (RNN)-based model. A "recurrent neural network" (RNN) is a type of neural network in which connections between units form a directed cycle. This creates an internal state of the network which allows it to exhibit dynamic temporal behavior. The RNN 84 model progressively builds up the output sequence 86 in a number of cycles.

Figure 6:
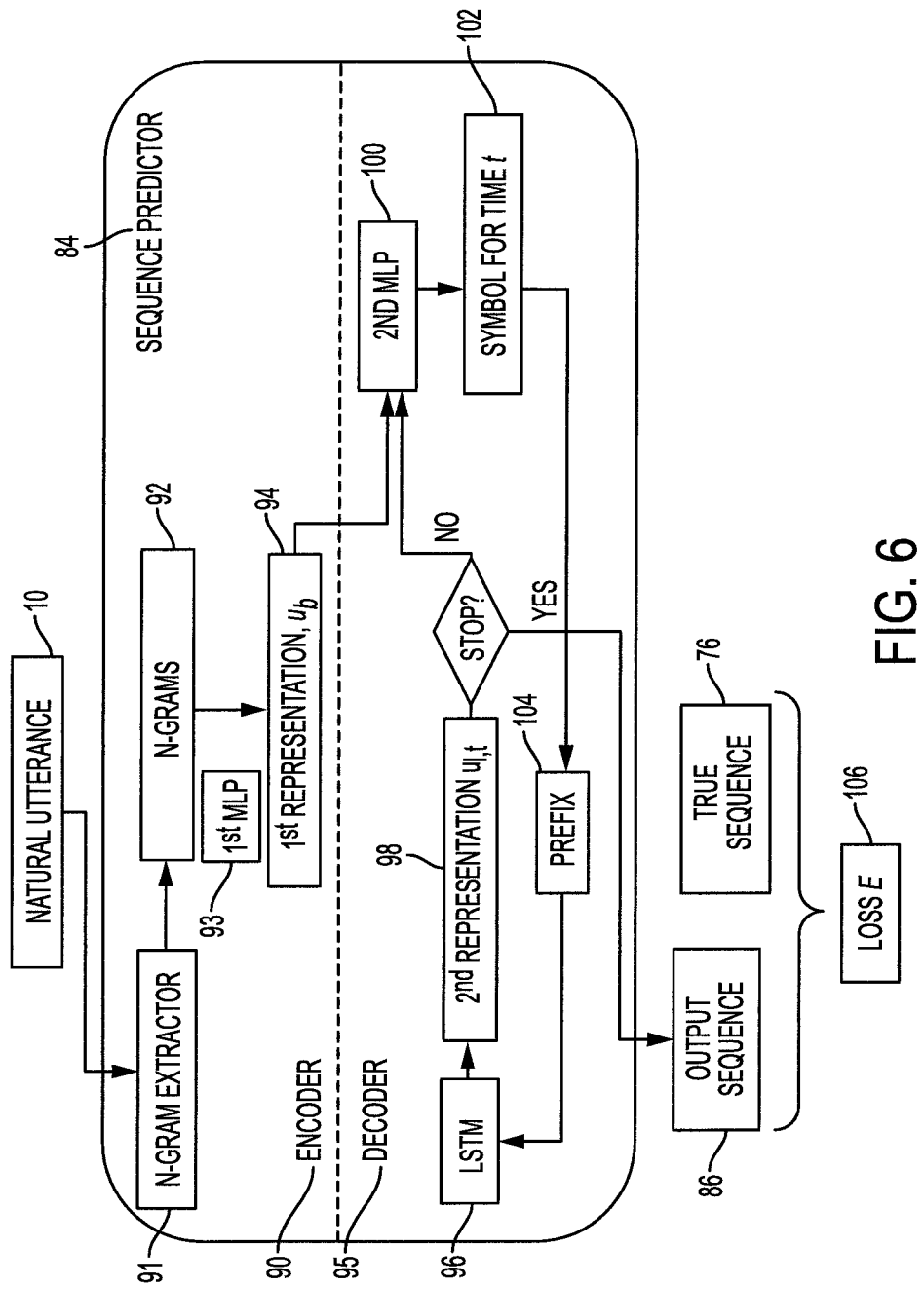
FIG. 6 illustrates an example neural network model in the system of FIG. 2.

As illustrated in FIG. 6, the model 84 includes an encoder 90, including an n-gram extractor 91, which first encodes the input sentence 10 as a set (bag) of n-grams 92 (e.g., unigrams and bigrams and optionally, longer n-grams, such as trigrams). The bag of n-grams representation is thus an integer-valued vector over the union of possible unigrams and bigrams. The n-grams may be composed of word(s) of the input sequence. Then a multilayer perceptron (MLP) 93 is applied on the bag of n-grams 92, to produce a first representation $u_b$ 94 in the form of a multi-dimensional vector. The model 84 includes a decoder 95, which includes a recurrent neural network (RNN), such as a long short-term memory (LSTM) 96, that encodes the prefix of the predicted sequence, generating a second representation $u_{l,t}$ 98 for each step t. The two representations 94, 98 are then fed into a second MLP 100 to predict the next symbol 102 of the target sequence 86. Current symbol 102 is appended to the previously generated symbols (if any) to generate the prefix 104 used by the LSTM 96 to generate $u_{l,t}$ 98 for the next step t. When the target sequence 86 is complete, it is output. During training, the output sequence is compared with the true sequence 76 to compute an error 106, which is used to update parameters of the model.

As an example, the first MLP 93 may be composed of two fully-connected layers of 100 dimensions for the first layer and 200 dimensions for the second one, with a non-linear (e.g., tangent hyperbolic) function between. The size of the embedding and of the hidden layers in the LSTM 96 may be set to 100. The MLP 100 predicting the next word may be composed of two fully-connected layers of 100 dimensions for the first layer, with a non-linear (e.g., tangent hyperbolic) function between the first and second layers. The last hidden layer is updated for the next cycle in which the next word of the sequence is predicted.

The number of possible symbols for the second layer of the MLP 100 to output may be from 20 to 1000, or at least 50, or up to 100, depending on the domain of interest and the type of output sequence 86. TABLE 1 provides example statistics for the prediction tasks.

TABLE 1

| Target sequence | DS | CF | LS |
| --- | --- | --- | --- |
| Typical Length | 10 | 20 | 40 |
| Vocabulary Size | 100 | 50 | 50 |

In general, DS is a shorter sequence than the LS or CF, but its vocabulary size (i.e., number of rules) is larger than that of LS and CF. However, in DS there is the ability to validate grammatical constraints. The CF is less lengthy than the LS, which uses a number of non "word-like" symbols such as parentheses, lambda variables, and the like.

The goal of the neural network 96 is to estimate the conditional probability $(y_1, \ldots, y_{T'} | x_1, \ldots, x_T)$, where $(x_1, \ldots, x_T)$ is an NL 10 and $(y_1, \ldots, y_{T'})$ is a target sequence 86 (LS 20, CF 12, or DS 16). In all three cases, the same neural network model can be employed.

The content of the NL 10 is captured in a real vector $u_b$, while the prefix of the target sequence up to time t is captured in another real vector $u_{l,t}$. Then, the probability of the target sequence 86, given the NL 10 can be estimated as:

$$p(y_1, \ldots y_{T'} | x_1, \ldots, x_T) = \prod_{t=1}^{T'} p(y_t | u_b, y_1, \ldots y_{t-1})$$

$$= \prod_{t=1}^{T'} p(y_t | u_b, u_{l,t-1})$$

i.e., as a product, over all iterations, of the probability of observing the current symbol $y_t$ in the context of $u_b$ and previously generated symbols $y_1, \ldots y_{t-1}$ (which can be replaced with $u_{l,t-1}$ where $u_{l,t-1}$ corresponds to the last hidden state of the LSTM).

The $u_b$ capturing the content of the NL may be calculated from the concatenation of a vector $u_1$ reading the sentence based on unigrams and another vector $u_2$ reading the sentence based on bigrams. In an exemplary embodiment, $u_1=s(W_1v_1)$ where $v_1$ is the 1-hot unigram encoding of the NL and $u_2=s(W_2v_2)$ where $v_2$ is its 1-hot bigram encoding. Then $u_b=\tan h(Wu)$, where u is the concatenation of $u_1$ and $u_2$. $W_1$, $W_2$ and $W$ are parameter matrices among the parameters to be learnt. s is a non-linear activation function that maps the weighted inputs to the output of each neuron. In the exemplary embodiment, s is the hyperbolic tangent activation function tan h, although other functions, such as the logistic sigmoid function, may be used. In the learning stage, the matrices $W_1$, $W_2$, W are progressively updated during learning of the model.

For regularization purposes, a dropout procedure is applied to $u_1$ and $u_2$. See, for example, the dropout procedure of Nitish Srivastava, et al., "Dropout: A Simple Way to Prevent Neural Networks from Overfitting," *J. Mach. Learn. Res.*, 15(1):1929-1958, 2014.

The prefix of the target sequence up to time t is modeled with the vector $u_{l,t}$, which is generated by the latest hidden state of the LSTM 96. A suitable LSTM is described in Sepp Hochreiter, et al., "Long Short-Term Memory," *Neural Computation*, 9(8):1735-1780, 1997. An LSTM is appropriate here in order to capture the long distance dependencies inside the target sequence. The vector $u_{l,t}$ is then concatenated with $u_b$ (forming $u_{bl}$) before passing through a two-layer MLP 100 for the final prediction of the next term (symbol) of the sequence:

$$p(y_{t+1}|u_{l,t},u_b)=\mathrm{softmax}(W'_2s'(W'_1u_{bl}))$$

where $u_{bl}$ is a combined representation, such as the concatenation of the vectorial representations $u_b$ and $u_{l,t-1}$, $W'_1$, $W'_2$ are parameter matrices that are learned during training, and s' is a non-linear activation function, e.g., the hyperbolic tangent activation function tan h. The softmax function is an operation that maps the vector $W'_2(s'(W'_1u_{bl}))$ to a vector of probabilities between 0 and 1 by taking the exponential of each coordinate and dividing it by a normalizing factor equal to the sum of these exponentials. In practice, a probability distribution is obtained and the term giving the maximum probability is chosen.

During prediction, the only representation evolving over time is $u_{l,t}$. The $u_b$ does not change once the natural utterance has been "read."

The whole network may be trained to minimize the cross entropy 106 between the predicted sequence of items and the reference sequence.

This network architecture can support other representations for the input sentence than unigrams and bigrams, as long as they are real vectors of fixed length. Other representations may be concatenated with $u_1$ and $u_2$ to generate $u_b$. As an example, an additional representation which reads the sentence through a second LSTM may be used.

Decoding the Target Sequence

A uniform-cost search algorithm can be used to decode the best decision sequence as the sequence with the highest probability. The algorithm finishes in a reasonable time for two reasons: 1) the vocabulary of each domain is relatively small, and 2) the exemplary model predicts relatively peaked distributions. As an alternative, a beam-search procedure may be used, particularly in cases where these conditions do not hold.

Figure 7:
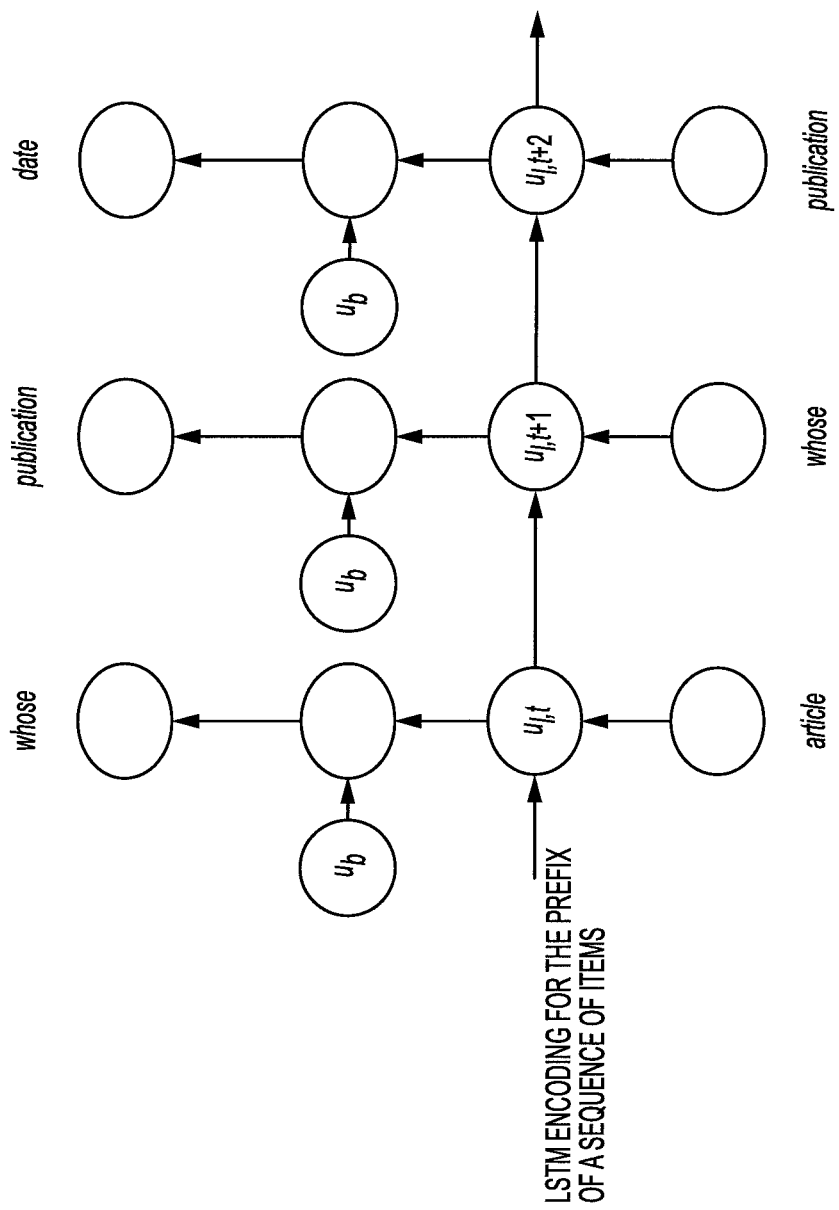
FIG. 7 illustrates an example of LSTM decoding.

An example of the generation of the canonical form 14 is shown in FIG. 7. It is assumed that the natural language utterance is article published in 1950. Assuming that, based on the $u_b$ of the sentence, the system successfully produced the first canonical word article. Another word embedding function then embeds the current canonical prefix article, which is input to the LSTM, which generates an encoding $u_{l,t}$ for the canonical prefix (or other sequence). The second MLP takes as input $u_b$ and the LSTM encoding $u_{l,t}$ of the canonical prefix up to time t, which is used to generate the probability distribution of next word of the canonical form, and to draw from this distribution the next word of the canonical form, for instance, whose. In the next cycle, the LSTM encodes the predicted part of the canonical form which is article whose, to generate $u_{l,t+1}$, which is input to the second MLP with $u_b$ to generate the next word publication, and so forth. In the illustrative example, the resulting canonical form may be: article whose publication date is 1950.

While this example uses the reading order of the input text sequence 10 in computing $u_b$, in another embodiment, the sequence may be reversed. In this case, the input would be 1950 in published article.

Generating the Logical Form (S110)

The sequence predictor 84 maps the NL question 10 into one of the three sequentializations 86, from which the LF 14 is predicted. The sequence predictor, on its own, may not ensure the grammaticality of the predicted sequence, so that some sequences do not lead to well-formed LFs. However, in the DSP case (in contrast to LFP and CFP), local constraints can be integrated into the sequence predictor that guarantee that only grammatical sequences will be produced.

In the case of LFP, the DS can be converted to a LF (or a CF). Assuming the DS is well-formed, the derivation tree DT can be constructed using the grammar rules (e.g., TABLE 1). For example, the tree 18 shown in FIG. 1 is built with the leftmost path first, going from the root s0 to a leaf typenp0. Then, since the grammar specifies that a node np0 has child nodes of type np and cp, the next symbol in the sequence 16 (cp0) is added to the tree as a child of np0, and so forth. The LF is then generated from the DT using the grammar rule projections. For example, to convert the DT 18 shown in FIG. 1, using the projections in TABLE 2 (the LF corresponding to each of the grammar rules), it can be seen that the node typenp0 corresponds to the word "article" in the LF, relnp0 to "pubDate," and entitynp0 to "1950." At higher levels, the rules incorporate information from the child nodes. For example, the node np0 is generated from np(get[CP,NP])→np(NP), cp(CP), where CP and NP (in upper case) are defined by the descendant nodes. For example, np1 defines np(NP) as being of typenp(NP), which in this tree corresponds to the word "article."

A similar approach can be used to generate the CF from Tables 1 and 2.

Each LF corresponds to a unique string representation which is its LS and each valid LS defines a unique LF. So if the LS is a valid one, it can be used directly to query the knowledge base. The query compiler 68 interprets this string formed LS to its tree formed LF.

In the case of CFP, the LF generation component 66 may include a parser which applies a set of grammar rules to derive a logical form 14 corresponding to a canonical form sequence 12 output by the neural network model. The grammar is one which uniquely pairs logical forms with canonical textual forms. An example parser which can be used as the LF generation component 66 includes grammatical rules similar to those described in Wang 2015, for example, but in this case, the grammar rules converts canonical forms to logical forms, rather than vice versa.

As will be appreciated, a set of two or more models can be provided which each predict a respective type of LS. The output LS of each model can be used to generate a LF. Each of the logical forms (if different), can be used to generate a query.

Training Data (S102)

The training data 72 includes text sequences 74 for a domain of interest (similar to sequences 10) and respective sequentialized forms 76.

The sequentialized forms 76 can be generated from logical forms. Various approaches for sequentialization of the logical forms are contemplated. Three methods are described by way of example: Logical Form Prediction (LFP), Canonical Form Prediction (CFP), and Derivation Sequence Prediction (DSP).

In the CFP method, the LF is first represented as a canonical form CF, which is itself a sequence of words. The canonical forms may be generated with the method described in copending application Ser. No. 15/147,222. In this method, logical forms 14 are generated using an underlying grammar, such as the SPO grammar of Wang 2015. This grammar, which is known a priori, makes explicit the structural constraints that have to be satisfied by the LFs. The SPO grammar, along with generating logical forms, can be used to generate canonical forms (CF), which are direct textual realizations of the LF that, although they are not "natural" English, transparently convey the meaning of the LF.

In the LFP method A, the LF, which is in the form of a tree, is linearized into a sequence 20 of individual tokens.

In the DSP method B, the LF is represented as a derivation sequence DS 16, i.e., the sequence of grammar rules that were chosen to produce the LF. The derivation sequences can be obtained by converting the LF to a CF, as described for the CFP method, and then parsing each canonical form using the DCG grammar described above. Grammatical constraints can be taken into account when using this model. Improved results have been shown with this approach compared to the other sequentializations.

To obtain NL sequences for the training data, the method of application Ser. No. 15/147,222 may be used. Specifically, a canonical form 12 is generated for each of a set of logical forms 14 and crowd sourcing is used to acquire paraphrases of the canonical forms, which are used as the corresponding NLs for each training pair. For further details on crowdsourcing for generation of training data 62, see Wang 2015.

Learning the Neural Network Model (S104)

The text sequences 74 in the training data 72 are input to the network model 84, together with the corresponding sequentialized form 76. The entire network model 84 is trained to minimize an objective function, which is a function of the cross entropy (or other loss function) between the predicted sequentialized form, output by the model 84, and the actual sequentialized form 76, from the training data 72, over all training pairs. The training includes updating the parameter matrices $W_1$, $W_2$, $W'_1$, $W'_2$ by backpropagation of a function of the loss E 106.

The objective function may be of the form: $H(p,q) = -\Sigma_x p(x) \log q(x)$, where p is the neural network predicted probability distribution and q is the empirical distribution associated with the training data.

In one embodiment, the model 84 is implemented in a neural network programming library, such as Keras (François Chollet, "Keras," GitHub repository, 2015, available at https://github.com/fchollet/keras; and "Keras: Deep Learning library for Theano and TensorFlow," available at http://keras.io/) on top of a compiler such as Theano (see, Bergstra, et al., "Theano: a CPU and GPU math expression compiler," Proc. Python for Scientific Computing Conf. (SciPy), vol. 4, p. 3, 2010; Bastien, et al., "Theano: new features and speed improvements" NIPS 2012 deep learning workshop; and Theano 0.7 documentation, available at http://deeplearning.net/software/theano/). The backpropagation algorithm used to train the neural network model 84 in Keras can be rmsprop (Tieleman et al., "Lecture 6.5-rmsprop: Divide the gradient by a running average of its recent magnitude," COURSERA: Neural Networks for Machine Learning 4, p. 2, 2012). The rmsprop method updates the weights in the weight matrices $W_1$, $W_2$, $W'_1$, $W'_2$ by keeping a moving average of the mean square for each weight as a sum of:

a) the previous mean square (weighted with a high weight, such as 0.9), and b) the value of the squared gradient at time t (weighted with a small weight, such as 0.1):

$$MeanSquare(w, t) = 0.9\ MeanSquare(w, t-1) + 0.1\left(\frac{\partial E}{\partial w}(t)\right)^2$$

The gradient is then divided by the square root of the mean square:

$$\frac{\frac{\partial E}{\partial w}(t)}{\sqrt{MeanSquare(w, t)}}.$$

The update for the weight is then proportional to this value (or proportional to some function of this value).

The training may proceed for a number mini batches and may be stopped when the objective function improves by less than threshold value.

Methods for learning neural network models 84 are described in LISA lab, University of Montreal, Deep Learning Tutorial Release 0.1, Sep. 1, 2015; Bojan Ploj, et al., "Border Pairs Method—Constructive MLP Learning Classification Algorithm," Advances in Machine Learning Research, Chapter 3, Vol. 6943 of the series Lecture Notes in Computer Science, pp 297-307 (2014) and Shashi Sathyanarayana "A Gentle Introduction to Backpropagation," available at http://numericinsight.com/uploads/A_Gentle_Introduction_to_Backpropagation.pdf.

The learned neural network model 84 can thus be used to map an input utterance 10, such as a question, to a predicted canonical form. Whereas Wang 2015 uses the paraphrases for trying to maximize similarity with the input through a search in the space of grammar derivations, in the present method, the training data 72 is used to learn the neural network model 84 which directly maps the input utterance into a sequentialized form 86, from which a logical form 14 can be generated.

Querying the Knowledge Base (S112, S114)

The logical form 14 can be used to generate a query for querying a knowledge base 32. The knowledge base may include a set of triples of the form (e1,p,e2), where e1 and e2 are entities (e.g., article1, 2015) and p is a property (e.g., publicationDate). The logical form is a semantic representation of a query which refers to such predicates as p and such entities as e1, e2.

Generating Utterance (S116)

In another embodiment, the logical form 14 can be generated from an utterance of a person seeking assistance from a call center. The logical form can be used by a dialog system to generate a next utterance for an agent conducting a discourse with the person. Dialogue systems are described, for example, in U.S. application Ser. No. 15/005,133, filed Jan. 25, 2016, entitled COMPLEXITY AWARE CALL-STEERING STRATEGY IN HETEROGENEOUS HUMAN/MACHINE CALL-CENTER ENVIRONMENTS, by Julien Perez, et al., U.S. application Ser. No. 14/702,850, filed May 4, 2015, entitled METHOD AND SYSTEM FOR ASSISTING CONTACT CENTER AGENTS IN COMPOSING ELECTRONIC MAIL REPLIES, by Marc Dymetman, et al., and U.S. application Ser. No. 14/811,005, filed Jul. 28, 2015, entitled A ROBUST REVERSIBLE FINITE-STATE APPROACH TO CONTEXTUAL GENERATION AND SEMANTIC PARSING, by Marc Dymetman, et al., the disclosures of which are incorporated herein by reference.

The method illustrated in one or more of FIGS. 3-5 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 58, (for example, an internal hard drive of RAM), or may be separate (for example, an external hard drive operatively connected with the computer 58), or may be separate and accessed via a digital data network such as a local area network (LAN) or the Internet (for example, as a redundant array of inexpensive or independent disks (RAID) or other network server storage that is indirectly accessed by the computer 58, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphics card CPU (GPU), or PAL, or the like. In general, any device, capable of implementing a finite state machine that is in turn capable of implementing the flowchart shown in one or more of FIGS. 3-5, can be used to implement the method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

The exemplary system and method provide improvements in fields such as automated and semi-automated dialogue systems for use in call-centers and in question-answering systems.

In summary, the exemplary method uses sequence prediction for semantic parsing. Experimental results show some significant improvements over previous systems. In an exemplary embodiment, derivation sequences are predicted taking into account grammatical constraints. Such a model performs better than sequence prediction models not exploiting this knowledge. These results can be obtained without the need to employ any reranking or linguistic features such as POS tags, edit distance, paraphrase features, etc. Rather than searching among the derivation sequences for the one that maximizes a match with the NL, the exemplary method directly predicts a decision sequence that can be mapped to the LF.

However, it is to be appreciated the method may be adapted to add re-reranking techniques, linguistic features, and/or by extending the neural networks with attention models similar to those described in Dzmitry Bandanau, et al., "Neural Machine Translation by Jointly Learning to Align and Translate," arXiv:1409.0473, 2014.

The exemplary method departs from existing approaches in that a direct mapping between natural language questions and their corresponding logical form or equivalently, their corresponding derivation sequence and canonical form. This simple, very direct approach to semantic parsing avoids the need for complex feature engineering and large external resources required by such paraphrase-based approaches as described in Anthony Fader, et al., "Paraphrase-Driven Learning for Open Question Answering," *Proc. 51st Annual Meeting of the ACL (Vol. 1: Long Papers)*, pp. 1608-1618, 2013; J. Berant, et al., "Semantic Parsing via Paraphrasing," *Association for Computational Linguistics (ACL)*, 2014. The method is also less complex than the two-step graph matching approach of Siva Reddy, et al., "Large-scale Semantic Parsing without Question-Answer Pairs," *Trans. ACL*, 2:377-392, 2014. The exemplary method can also capture much more complex semantic representations than the embeddings-based method described by Antoine Bordes, et al., "Question Answering with Subgraph Embeddings," *Proc.* 2014 Conf. on Empirical Methods in Natural Language Processing, EMNLP 2014, pp. 615-620, 2014; and Antoine Bordes, et al., "Open Question Answering with Weakly Supervised Embedding Models," *arXiv:*1404.4326, 2014.

The exemplary method approach differs from previous work in that it exploits the fact that logical forms are structured objects whose shape is determined by an underlying grammar. Using the power of RNN as sequence predictors, the model learns to predict, from more or less explicit representations of this underlying grammar, equivalent but different representations of a sentence content namely, its canonical form, its logical form and/or its derivation sequence.

Without intending to limit the scope of the exemplary embodiment, the following examples illustrate the applicability of the method.

EXAMPLES

Experiments were conducted on the SPO dataset of Wang 2015. The SPO system together with its dataset were released to the public (https://github.com/percyliang/sempre (https://github.com/percyliang/sempre)). To test the overall performance of a semantic parser, the SPO dataset contains seven domains focusing on different linguistic phenomena such as multi-arity relations, sublexical compositionality etc. The utterances in each domain are annotated both with logical forms (LFs) and canonical forms (CFs). The number of such utterances varies from 800 to 4000, depending on the domain. The size of the training data is relatively small but as the targeted vocabulary is always in the domain, thus very small as well, learning a reasonable semantic parser is feasible for evaluating the method.

In the SPO dataset, the natural utterances were split randomly into 80%-20% for training and test, and the same sets were used in the experiments. An additional 80%-20% random split was performed on the SPO training data and the 20% kept as a development set for selection of the hyperparameters of the model. Once the hyperparameters are chosen, retraining is performed on the whole training data before testing.

For LFP experiments, the LF is directly tokenized, to generate an LS 20. For CFP experiments, the CF is used directly. For DSP experiments (DSP-S, DSP-C, DSP-CL), where the training data consist of (NL, DS) pairs, the derivation sequences are obtained by parsing each canonical form using the DCG grammar described above.

The different systems are compared to the SPO method of Wang 2015. While only unigram and bigram features are used on the NL, SPO uses a number of features of different kinds: linguistic features on NL such as POS tags, lexical features computing the similarity between words in the NL and words in the CF, semantic features on types and denotations, and also features based on the Paraphrase Database (PPDB) of Ganitkevitch, et al., "PPDB: The Paraphrase Database," *Proc.* 2013 *Conf. of the North American Chapter of the Association for Computational Linguistics: Human Language Technologies*, pp. 758-764, 2013.

At prediction time, as for SPO, the system is evaluated on the proportion of questions for which the system is able to find the correct answer in the knowledge base.

Implementation Details

The embedding vectors $u_1$ for unigrams and $u_2$ for bigrams each had 50 dimensions. The vector $u_b$ representing the sentence content has 200 dimensions. The word embedding layer has 100 dimensions, which is also the case of the hidden layer of the LSTM $u_{l,t}$. Thus $u_{bl}$ which is the concatenation of $u_b$ and $u_{l,t}$ has 300 dimensions and the next layer to $u_{bl}$ is fixed at 100 dimensions. The model is implemented in Keras (https://github.com/fchollet/keras) on top of Theano (James Bergstra, et al., "Theano: a CPU and GPU Math Expression Compiler," *Proc. Python for Scientific Computing Conference (SciPy)*, 2010). For all the experiments, the models were trained using rmsprop (T. Tieleman, et al., "Lecture 6.5-rmsprop: Divide the gradient by a running average of its recent magnitude," 2012), as the backpropagation algorithm. All the hyperparameters of rmsprop as well as options for initializing the neural network are left at their default values in Keras.

The development set was used to select the number of training epochs, the dropout factor over unigrams representation, and the dropout factor over bigrams representation, by employing a grid search over these hyperparameters: epochs in {20, 40, 60}, unigrams dropout in {0.05, 0.1} and bigrams dropout in {0.1, 0.2, 0.3}.

Experimental Results

TABLE 2 shows the test results of SPO and of the exemplary systems over the seven domains. In TABLE 2, the numbers reported correspond to the proportion of cases in which the predicted LF is interpretable against the KB and returns the correct answer.

TABLE 2

Test results over different domains on SPO dataset

| Original split | Basketball | Social | Publication | Blocks | Calendar | Housing | Restaurants | Avg |
|---|---|---|---|---|---|---|---|---|
| SPO | 46.3 | 48.2 | 59.0 | 41.9 | 74.4 | 54.0 | 75.9 | 57.1 |
| LFP | 73.1 | 70.2 | 72.0 | 55.4 | 71.4 | 61.9 | 76.5 | 68.6 |
| CFP | 80.3 | 79.5 | 70.2 | 54.1 | 73.2 | 63.5 | 71.1 | 70.3 |
| DSP-S | 71.6 | 67.5 | 64.0 | 53.9 | 64.3 | 55.0 | 76.8 | 64.7 |
| DSP-C | 80.5 | 80.0 | 75.8 | 55.6 | 75.0 | 61.9 | 80.1 | 72.7 |
| DSP-CL | 80.6 | 77.6 | 70.2 | 53.1 | 75.0 | 59.3 | 74.4 | 70.0 |

It can be seen that all the exemplary sequence-based systems perform better than SPO by a large margin on these tests. When averaging over the seven domains, even the DSP-S system scores 64.7%, compared to 57.1% for SPO. This is surprising, given that DSP-S has the handicap that it may generate ungrammatical sequences relative to the underlying grammar, which do not lead to interpretable LFs. The LFP and CFP models, with higher performance than DSP-S, also may generate ungrammatical sequences.

The best results overall are obtained by the DSP-C system, which does take into account the grammatical constraints. This model performs not only considerably better than the DSP-S baseline (72.7% over 64.7%), but also better than the LFP and CFP models. The DSP-CL model, which exploits constraints not only during decoding, but also during training, does not perform as well as the DSP-C model, which only exploits the constraints during decoding.

For all the sequence based models, results are based solely on the performance of the first sequence predicted by the model. Further improvements may be achieved by reranking the n-best sequence lists using a set of features similar to those used by SPO.

The CFP and LFP perform well on the test data, even though the sequences generated are not guaranteed to be grammatical. The percentage of grammatical errors made by these models and also by DSP-S for three domains were obtained. DCG permits computing this error rate directly for canonical forms and derivation sequences. For logical forms, an estimation was made by executing them against the knowledge base and eliminating the cases where the errors are not due to the ungrammaticality of the logical form.

TABLE 3 shows the grammatical error rates for the three exemplary systems.

TABLE 3

Grammatical error rate of different systems on testing

|  | Basketball | Publication | Housing |
|---|---|---|---|
| LFP | 6.6 | 3.7 | 1.6 |
| CFP | 1.8 | 1.9 | 2.2 |
| DSP-S | 9.5 | 11.8 | 5.8 |

TABLE 3 shows that LFP and especially CFP make few grammatical errors, while DSP-S makes them more frequently.

Difference Between DSP-C and DSP-CL

As noted above the DSP-CL model does not perform as well as DSP-C in the experiments. This may be due in part to differences in the two models. For example, suppose that, for a certain prediction step, only two rules are considered as possible by the grammar, among the many rules of the grammar. Suppose that the LSTM gives probabilities 0.004 and 0.006 respectively to these two rules, the rest of the mass being on the ungrammatical rules. While the DSP-C model associates respective losses of −log 0.004, −log 0.006 with the two rules, the DSP-CL model normalizes the probabilities first, resulting in smaller losses −log 0.4, −log 0.6.

Since the best complete sequence is chosen during decoding, it means that DSP-C will be more likely to prefer to follow a different path in such a case, in order not to incur a loss of at least −log 0.006. In practice, this means that DSP-C will prefer paths where the LSTM, on its own, gives a small probability to ungrammatical choices, a property not shared by DSP-CL.

The results suggest the benefits of a sequence-based approach for the task of semantic parsing, in which the target logical form, a structured object, is encoded through one three types of sequences: direct linearization of the logical form, canonical form, and derivation sequence in an underlying grammar.

In order to encode the underlying derivation tree as a linear sequence, a leftmost derivation sequence was employed. However, other possible choices may make the encoding even more easily learnable by the LSTM.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method comprising:
   providing a neural network model which has been trained to predict a sequentialized form for an input text sequence, the sequentialized form comprising a sequence of symbols, the neural network model comprising:
   an encoder which generates a representation of the input text sequence based on a representation of n-grams in the text sequence, the n-grams including unigrams and bigrams from a defined set of n-grams, and
   a decoder which sequentially predicts a next symbol of the sequentialized form based on the representation and a predicted prefix of the sequentialized form, the decoder comprising a recurrent neural network which, for each of a sequence of steps, generates a representation of a current prefix of the sequentialized form, the representation of the current prefix being used to predict the next symbol, the next symbol being appended to the current prefix to generate a new current prefix for a next step in the sequence;
   receiving an input text sequence;
   with a processor, predicting a sequentialized form for the input text sequence with the trained neural network model;
   converting the sequentialized form to a structured form; and
   outputting information based on the structured form.

2. The method of claim 1, further comprising providing a mapping for converting the sequentialized form to the structured form.

3. The method of claim 1, wherein the structured form is a logical form.

4. The method of claim 1, wherein the sequentialized form is selected from a linearized logical form and a derivation sequence.

5. The method of claim 4, wherein sequentialized form is a derivation sequence.

6. The method of claim 5, wherein the neural network model incorporates grammatical constraints on derivation sequences.

7. The method of claim 5, wherein the symbols comprise grammar rules from a predefined set of grammar rules.

8. The method of claim 1, further comprising:
   generating a query based on the structured form;
   querying a knowledge base with the query; and
   retrieving a response to the query from the knowledge base, the output information being based on the response.

9. The method of claim 1, further comprising:
   training the neural network model on training data, the training data comprising training pairs, each training pair including a sequentialized form and a corresponding text sequence.

10. The method of claim 1, wherein the encoder comprises a first multilayer perceptron which generates the representation of the input text sequence based on the representation of n-grams.

11. The method of claim 1, wherein the recurrent neural network comprises a second long short-term memory neural network.

12. The method of claim 10, wherein the decoder comprises a multilayer perceptron which sequentially generates a next symbol of the sequentialized form based on the representation and the predicted prefix of the sequentialized form.

13. A system comprising memory which stores instructions for performing the method of claim 1 and a processor in communication with the memory which executes the instructions.

14. A computer program product comprising a non-transitory storage medium storing instructions which, when executed by a computer, perform the method of claim 1.

15. A method comprising:
   providing a neural network model which has been trained to predict a sequentialized form for an input text sequence, the sequentialized form comprising a sequence of symbols, the neural network model comprising:
   an encoder which generates a representation of the input text sequence based on a representation of n-grams in the text sequence, and a decoder which sequentially predicts a next symbol of the sequentialized form based on the representation and a predicted prefix of the sequentialized form, wherein the next symbol of the sequentialized form is estimated as:

$$p(y_{t+1}|u_{l,t}, u_b) = \text{softmax}(W'_2 s'(W'_1 u_{bl}))$$

where $u_{bl}$ is a combined representation generated from the representation $u_b$ and the predicted prefix $u_{l,t-1}$, $W'_1$, $W'_2$ are parameter matrices that are learned during training, and s' is a non-linear activation function;

receiving an input text sequence;

with a processor, predicting a sequentialized form for the input text sequence with the trained neural network model;

converting the sequentialized form to a structured form; and outputting information based on the structured form.

16. The method of claim 15, wherein the decoder comprises a neural network which sequentially predicts the prefix of the sequentialized form.

17. A system comprising:

memory which stores a neural network model which has been trained to predict a sequentialized form for an input text sequence, the sequentialized form comprising a sequence of symbols, the neural network model comprising:

an encoder which generates a representation of the input text sequence based on a representation of n-grams in the text sequence, the n-grams including bigrams, and a decoder which, in a sequence of steps, sequentially predicts symbols of the sequentialized form based on the representation and a predicted prefix of the sequentialized form, wherein the predicted prefix of a next step is generated by appending the predicted symbol to the predicted prefix of a current step;

a prediction component which predicts a sequentialized form for an input text sequence with the trained neural network model;

a structured form generation component which converts the sequentialized form to a structured form;

an output component which outputs information based on the structured form; and a processor which implements the prediction component, structured form generation component, and output component.

18. The system of claim 17, further comprising a learning component which trains the neural network model on training data, the training data comprising training pairs, each training pair including a sequentialized form and a corresponding text sequence.

19. The system of claim 17, further comprising a querying component which queries a knowledge base with a query based on the structured form for retrieving responsive information.

20. A method for predicting a sequentialized form comprising:

providing training data, the training data comprising a collection of training pairs, each training pair in the collection including a derivation sequence and a corresponding text sequence, the derivation sequence comprising a sequence of symbols drawn from a finite set of symbols;

with the training data, training a neural network model to predict a derivation sequence for an input text sequence, the neural network model comprising:

an encoder which generates a representation of the input text sequence based on a representation of n-grams in the text sequence, and a decoder which, in each of a sequence of steps, sequentially predicts a next symbol of the derivation sequence, based on the representation and a current predicted prefix of the sequentialized form;

receiving an input text sequence;

with a processor, predicting a derivation sequence for the input text sequence with the trained neural network model, the predicted derivation sequence comprising a sequence of symbols drawn from the finite set of symbols; and outputting information based on the predicted derivation sequence.

21. The method of claim 20, further comprising mapping the derivation sequence to the structured form.

* * * * *